US012697684B2

(12) United States Patent
Buller et al.

(10) Patent No.: US 12,697,684 B2
(45) Date of Patent: Aug. 4, 2026

(54) THREE-DIMENSIONAL PRINTING SYSTEMS AND METHODS OF THEIR USE

(71) Applicant: Velo3D, Inc., Campbell, CA (US)

(72) Inventors: Benyamin Buller, Cupertino, CA (US); Zachary Ryan Murphree, San Jose, CA (US)

(73) Assignee: Velo3D, Inc., Fremont, CA (US)

( * ) Notice: Subject to any disclaimer, the term of this patent is extended or adjusted under 35 U.S.C. 154(b) by 612 days.

(21) Appl. No.: 18/216,720

(22) Filed: Jun. 30, 2023

(65) Prior Publication Data

US 2024/0024984 A1 Jan. 25, 2024

Related U.S. Application Data

(63) Continuation of application No. 18/121,663, filed on Mar. 15, 2023, now abandoned, which is a (Continued)

(51) Int. Cl.
| | |
|---|---|
| *B23K 26/342* | (2014.01) |
| *B23K 26/00* | (2014.01) |
| *B23K 26/08* | (2014.01) |
| *B23K 26/082* | (2014.01) |
| *B23K 26/12* | (2014.01) |
| *B23K 26/142* | (2014.01) |
| *B23K 26/70* | (2014.01) |
| *B23K 103/04* | (2006.01) |
| *B23K 103/10* | (2006.01) |
| *B23K 103/14* | (2006.01) |
| *B23K 103/18* | (2006.01) |

(Continued)

(52) U.S. Cl.
CPC ........ *B23K 26/342* (2015.10); *B23K 26/0006* (2013.01); *B23K 26/082* (2015.10); *B23K 26/0821* (2015.10); *B23K 26/0853* (2013.01); *B23K 26/127* (2013.01); *B23K 26/142* (2015.10); *B23K 26/707* (2015.10); *B33Y 30/00* (2014.12); *B23K 2103/04* (2018.08); *B23K 2103/05* (2018.08); *B23K 2103/10* (2018.08); *B23K 2103/14* (2018.08); *B23K 2103/26* (2018.08); *B33Y 50/02* (2014.12)

(58) Field of Classification Search
CPC .............. B23K 26/127; B23K 26/0853; B23K 26/0006; B23K 26/707; B23K 26/142; B23K 26/0821; B23K 26/082; B23K 26/342; B23K 2103/04; B23K 2103/05; B23K 2103/10; B23K 2103/26; B33Y 50/02; B33Y 30/00; B22F 10/38; B22F 10/322
See application file for complete search history.

(56) References Cited

U.S. PATENT DOCUMENTS

| | | | | |
|---|---|---|---|---|
| 2012/0251378 | A1* | 10/2012 | Abe ........................ | B22F 10/28 |
| | | | | 425/78 |
| 2016/0339639 | A1* | 11/2016 | Chivel ................... | B29C 64/35 |

(Continued)

*Primary Examiner* — Brian W Jennison
(74) *Attorney, Agent, or Firm* — Bryan L. Baysinger; Nicholas P. Stadnyk; Maynard Nexsen PC

(57) ABSTRACT

The present disclosure describes three-dimensional (3D) printing apparatuses, processes, software, and systems for producing high quality 3D objects. Described herein are printing apparatuses features that facilitate control of debris within an enclosure where one or more printing operations are performed.

20 Claims, 9 Drawing Sheets

Related U.S. Application Data continuation of application No. 18/070,518, filed on Nov. 29, 2022, now abandoned, which is a continuation of application No. 17/887,660, filed on Aug. 15, 2022, now abandoned, which is a continuation of application No. 17/739,331, filed on May 9, 2022, now abandoned, which is a continuation of application No. 17/587,068, filed on Jan. 28, 2022, now abandoned, which is a continuation of application No. 17/502,434, filed on Oct. 15, 2021, now abandoned, which is a continuation of application No. 17/363,607, filed on Jun. 30, 2021, now abandoned, which is a continuation of application No. 17/208,344, filed on Mar. 22, 2021, now abandoned, which is a continuation of application No. 17/117,945, filed on Dec. 10, 2020, now abandoned, which is a continuation of application No. 17/005,454, filed on Aug. 28, 2020, now abandoned, which is a continuation of application No. 16/872,646, filed on May 12, 2020, now abandoned, which is a continuation of application No. 16/749,899, filed on Jan. 22, 2020, now abandoned, which is a continuation of application No. 16/590,868, filed on Oct. 2, 2019, now abandoned, which is a continuation of application No. 16/449,965, filed on Jun. 24, 2019, now abandoned, which is a continuation of application No. 16/291,759, filed on Mar. 4, 2019, now abandoned, which is a continuation of application No. 15/855,744, filed on Dec. 27, 2017, now Pat. No. 10,272,525.

(51) Int. Cl.
*B33Y 30/00* (2015.01)
*B33Y 50/02* (2015.01)

(56) References Cited

U.S. PATENT DOCUMENTS

| | | | |
|---|---|---|---|
| 2018/0015670 A1* | 1/2018 | Gu | B33Y 30/00 |
| 2019/0232429 A1* | 8/2019 | Buller | B23K 26/1438 |

* cited by examiner

THREE-DIMENSIONAL PRINTING SYSTEMS AND METHODS OF THEIR USE

CROSS-REFERENCE

This application is a continuation of U.S. patent application Ser. No. 18/121,663 filed Mar. 15, 2023, which is a continuation of U.S. patent application Ser. No. 18/070,518 filed Nov. 29, 2022, which is a continuation of U.S. patent application Ser. No. 17/887,660 filed Aug. 15, 2022, which is a continuation of U.S. patent application Ser. No. 17/739, 311 filed May 9, 2022, which is a continuation of U.S. patent application Ser. No. 17/587,068 filed Jan. 28, 2022, which is a continuation of U.S. patent application Ser. No. 17/502, 434 filed Oct. 15, 2021, which is a continuation of U.S. patent application Ser. No. 17/363,607 filed Jun. 30, 2021, which is a continuation of U.S. patent application Ser. No. 17/208,344 filed Mar. 22, 2021, which is a continuation of U.S. patent application Ser. No. 17/117, 945 filed Dec. 10, 2020, which is a continuation of U.S. patent application Ser. No. 17/005,454 filed Aug. 28, 2020, which is a continuation of U.S. patent application Ser. No. 16/872,646 filed May 12, 2020, which is a continuation of U.S. patent application Ser. No. 16/749,899 filed Jan. 22, 2020, which is a continuation of U.S. patent application Ser. No. 16/590,868 filed Oct. 2, 2019, which is a continuation of U.S. patent application Ser. No. 16/449,965 filed Jun. 24, 2019, which is a continuation of U.S. patent application Ser. No. 16/291,759 filed Mar. 4, 2019, which is a continuation of U.S. patent application Ser. No. 15/855,744 filed Dec. 27, 2017, now Pat. No. 10,272, 525, each of which is entirely incorporated herein by reference.

BACKGROUND

Three-dimensional (3D) printing is a process for making objects under computer control. Often, the objects are made sequentially by forming multiple layers of material that are joined together to form a 3D object having desired dimensions. A variety of materials can be used, including metal, ceramic, or polymeric materials. 3D printing systems can vary in their methods of forming the multiple layers, such as by melting, sintering, softening, hardening, or liquifying. The quality of a 3D object can depend on the processing conditions for printing the 3D object. For example, the type of material, the temperatures used to perform the joining, as well as atmospheric conditions surrounding the 3D object during its formation, which may influence characteristics, such as the shape, roughness, and porosity, of the 3D object. Currently needed are improved 3D printing systems and methods for forming high quality 3D objects, at a competitive cost.

SUMMARY

In one aspect, systems, apparatuses, methods, controllers, and/or non-transitory computer-readable media (e.g., software) for printing three-dimensional objects is described.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume; one or more windows coupled to the ceiling wall, wherein the one or more windows is configured to transmit the one or more laser beams therethrough to the internal volume; one or more galvanometer scanners configured to move the one or more laser beams within a processing cone region within the internal volume of the processing chamber, wherein the one or more galvanometer scanners is external to the internal volume of the processing chamber; a gas flow system operationally coupled with the processing chamber and configured to provide a flow of gas across at least a portion of the processing cone region, wherein during the printing the flow of gas maintains a debris concentration of about 1 to about 1,000 milligrams per cubic meter (a) in the processing cone region and (b) at least about 20 millimeters above the surface of the powder bed, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume; one or more windows coupled to the ceiling wall, wherein the one or more windows is configured to transmit the one or more laser beams therethrough to the internal volume; one or more galvanometer scanners configured to move the one or more laser beams within a processing cone region within the internal volume of the processing chamber, wherein the one or more galvanometer scanners is external to the internal volume of the processing chamber; a gas flow system operationally coupled with the processing chamber and configured to provide a flow of gas across at least a portion of the processing cone region, wherein during the printing the flow of gas maintains a debris concentration for debris particles having diameters of about 0.5 micrometers or greater of about 0.5 to about 1,000 particles per cubic centimeter (a) in the processing cone region and (b) at least about 20 millimeters above the surface of the powder bed, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume of the processing chamber; one or more windows coupled to the ceiling wall, wherein the one or more windows is configured to transmit the one or more laser beams therethrough to the internal volume; one or more galvanometer scanners configured to move the one or more laser beams within the internal volume of the processing chamber, wherein the one or more galvanometer scanners is external to the internal volume of the processing chamber; a gas flow system operationally coupled with the processing chamber and configured to provide a flow of gas across at least a portion of each of the one or more laser beams, wherein during the printing, a number of debris particles having diameters greater than about 0.5 micrometers encountered by each of the one or more laser beams is between about 10 and about 10,000, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In some embodiments, the debris concentration within the at least the portion of the processing cone region varies during the printing. In some embodiments, the wherein the gas-borne debris within the internal volume is formed during the melting of the at least the portion of the powder bed to the molten material as part of the three-dimensional object. In some embodiments, the during the printing, the gas flow system is configured to facilitate movement of the gas-borne debris at least in the processing cone region. In some embodiments, the gas flow system is configured to facilitate the movement of the gas-borne debris corresponding to a turbulent movement at least in the processing cone region. In some embodiments, the turbulent movement comprises a cyclic movement. In some embodiments, the turbulent movement comprises a backflow or a standing vortex. In some embodiments, at least one valve of the gas flow system is configured to facilitate the movement of the gas-borne debris. In some embodiments, the an internal shape of the processing chamber is configured to facilitate the movement of the gas-borne debris. In some embodiments, a wall of the processing chamber is configured to facilitate the movement of the gas-borne debris. In some embodiments, the wall of the processing chamber is a side wall. In some embodiments, the debris concentration is present at a height of at least about 30 millimeters above the surface of the powder bed. In some embodiments, the debris concentration is present at a height of at least about 50 millimeters above the surface of the powder bed. In some embodiments, the gas flow system is configured to provide at least a portion of the flow of gas in a direction that is substantially parallel to the surface of the powder bed and/or the platform. In some embodiments, the flow of gas has a peak horizontal velocity ranging from about 0.2 to about 2 meters per second (m/s). In some embodiments, the flow of gas has a peak horizontal velocity within a height of about 15 and about 100 millimeters (mm) above the surface of the powder bed and/or the platform. In some embodiments, the flow of gas has a peak horizontal velocity height that varies along a length of the powder bed and/or the platform. In some embodiments, each of the one or more lasers is configured to generate a laser beam having a power density ranging from about 100 to about 30,000 Kilo Watts per centimeter squared (kW/cm2), as measured at the surface of the powder bed. In some embodiments, the apparatus further comprises an optical system configured to modify at least one characteristic of the one or more laser beams, wherein the optical system is configured to generate a focused or a defocused laser beam at the surface of the powder bed. In some embodiments, the apparatus further comprises a build module removably coupled to the processing chamber during the printing, wherein the processing chamber is configured decouple from the build module after the printing. In some embodiments, the processing chamber is configured to allow an external atmosphere to enter the internal volume after printing. In some embodiments, during the printing, the gas flow system is configured to change a direction of the flow of gas within the internal volume. In some embodiments, during the printing, the gas flow system is configured change a velocity of the flow of gas within the internal volume during. In some embodiments, the apparatus is configured to print the three-dimensional object with a surface roughness (Ra) of at most about 50 micrometers as measured along a surface of the 3D object that is at an angle ranging from about 85 to about 120 degrees in relation to a support surface of the platform during the printing. In some embodiments, the gas-borne debris comprises particles having diameters ranging from about 0.1 micrometer to about 1 micrometer. In some embodiments, during the printing, the apparatus is configured generate at least about 5 milligrams of the gas-borne material debris per second. In some embodiments, the gas-borne debris comprises particles having at least about 10% metal oxide measured as volume per volume. In some embodiments, during the printing, the apparatus is configured to melt from about 1 to about 50 cubic centimeters per hour (cm3/hr) of the molten material per laser. In some embodiments, the flow of gas enters the internal volume via one or more inlet openings and exits the internal volume via one or more outlet openings, which openings are configured to facilitate the movement of the gas-borne debris. In some embodiments, the one or more inlet openings and/or the one or more outlet openings correspond to openings of a perforated plate, a screen, a mesh or a gas permeable material. In some embodiments, the one or more inlet openings and/or the one or more outlet openings are configured to facilitate the flow of gas from the one or more inlet openings to the one or more outlet openings in a substantially horizontal direction. In some embodiments, the one or more inlet openings and/or the one or more outlet openings are configured to facilitate the flow of gas from the one or more inlet openings to the one or more outlet openings such that it flows substantially parallel with respect to the surface of the powder bed. In some embodiments, the one or more inlet openings are within an inlet region coupled to a ceiling of the processing chamber, and the one or more outlet openings are within a side wall or a floor of the processing chamber. In some embodiments, the one or more inlet openings are within an inlet region coupled to a first side wall of the processing chamber, and the one or more outlet openings are within a second side wall or a floor of the processing chamber. In some embodiments, the number of debris particles is within a laser beam volume within the internal volume of the processing chamber.

Another aspect of the present disclosure provides a method for using the apparatuses disclosed herein (e.g., according to its intended function).

In another aspect, an apparatus for printing one or more 3D objects comprises a controller that is programmed to direct a mechanism used in a 3D printing methodology to implement (e.g., effectuate) any of the method and/or functions of the apparatuses disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method and/or functions of the apparatuses disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods and/or functions of the apparatuses disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods and/or functions of the apparatuses disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIGS. 8A and 8B schematically illustrate section views of portions of 3D printers.

Figure 1:
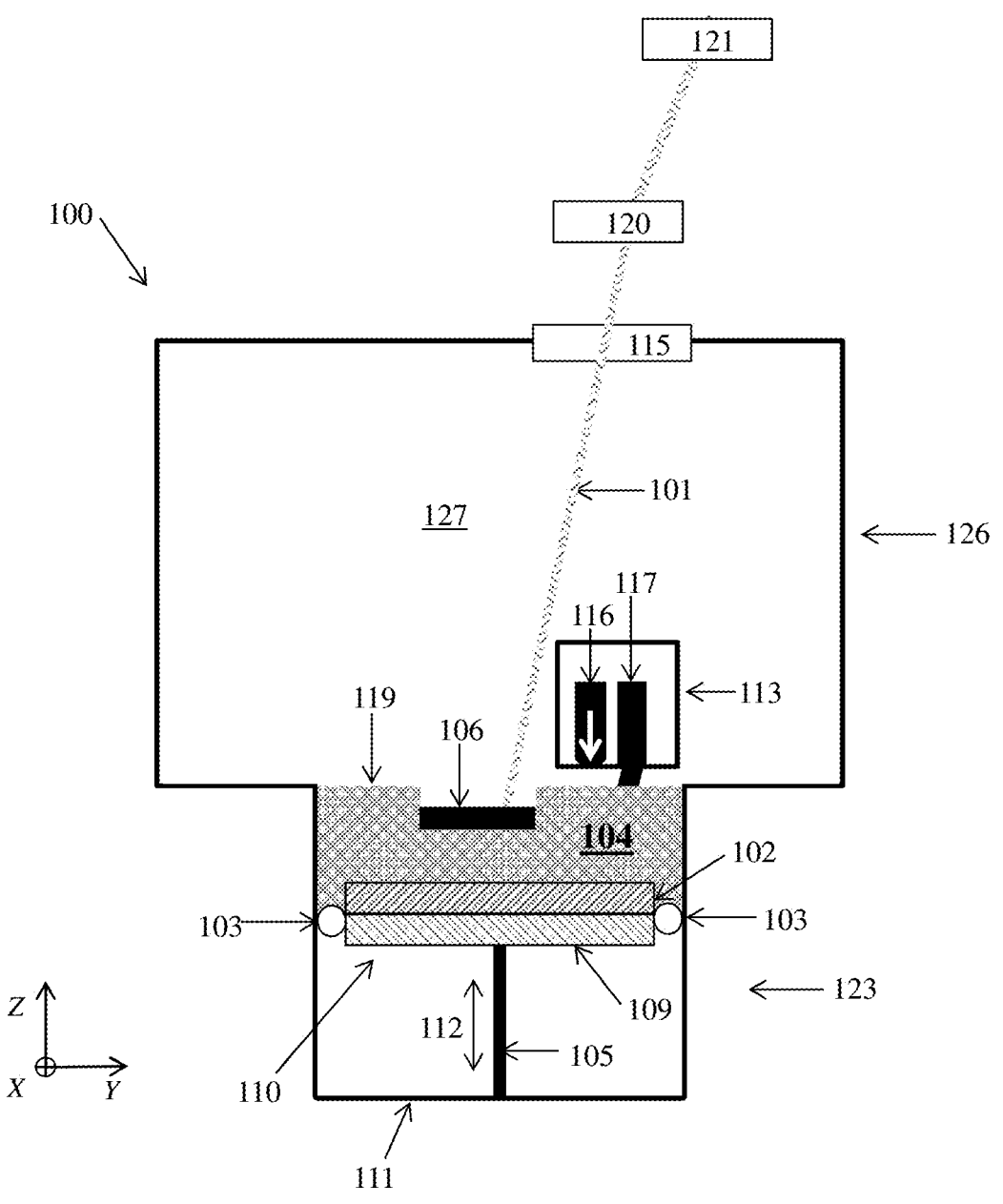
FIG. 1 schematically illustrates a section view of a portion of a three-dimensional (3D) printer.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

The present disclosure provides apparatuses, systems and methods for controlling aspects of printing 3D objects (e.g., using a laser beam). In some embodiments, the apparatuses, systems and methods control an amount of debris generated within an enclosure as a byproduct of a printing process. Methods include controlling gas flow at least within a processing cone region where the laser beam may travel when scanning over a powder bed to melt the powder as part of the 3D printing process. In some cases, the methods involve controlling gas flow and debris concentration at least within particular portions of the processing cone region (e.g., within a processing chamber). In some cases, the methods involve controlling gas flow and a number of debris particles encountered by the energy beam (e.g. laser beam). The methods described herein can be used to print one or more 3D objects with low porosity and/or low surface roughness. In some embodiments, the printing systems are configured to print 3D object having a porosity at most about 1% by volume and/or a surface roughness (Ra) of at most about 50 micrometers.

The term "operatively coupled" or "operatively connected" refers to a first mechanism that is coupled (or connected) to a second mechanism to allow the intended operation of the second and/or first mechanism. The term "configured to" refers to an object or apparatus that is (e.g., structurally) configured to bring about a result.

Terms such as "a," "an" and "the" are not intended to refer to only a singular entity, but include the general class of which a specific example may be used for illustration. The terminology herein is used to describe specific embodiments, but their usage does not limit the specified embodiments.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The present disclosure provides three-dimensional (3D) printing apparatuses, systems, software, and methods for forming 3D objects. A powder, as understood herein, is a granular material before it has been melted using a printing operation (also referred to as "printing"). During printing can referred to as the time frame in which a laser beam is impinging on the powder material and transforming (e.g., melting) the powder material to a molten state. In some embodiments, the size of the particles of the powder range from about 10 micrometers (μm) to about 50 μm in diameter. The printing can include sequentially melting multiple sequentially deposited layers of powder respectively, where one layer of melted (molten) material fuses with an adjacent layer to form at least a portion of a 3D object. Some of the printing techniques described herein are in accordance with selective laser melting (SLM), selective heat sintering (SHS), or selective laser sintering (SLS) techniques. The powder can be made of any suitable material. The powder may comprise an elemental metal or metal alloy. In some embodiments, the material comprises a metal, such as steel (e.g., stainless steel), aluminum, aluminum alloys, nickel, nickel alloys (e.g., Inconel), titanium and/or titanium alloys.

The 3D printing system (also referred to herein as "printer" or "printer system") may include an enclosure. FIG. 1 shows a cross-section side view of an example 3D printer having an enclosure 100, which includes a processing chamber 126 and a build module 123 that is configured to accommodate the powder bed 104. The processing chamber has walls that define an internal volume 127. The internal volume of the processing chamber can accommodate a laser beam 101 generated by a laser 121. In some cases, the laser beam is directed through a window 115 that is coupled to a wall of the processing chamber. In some embodiments, the window is coupled to a ceiling (e.g., top wall) of the processing chamber. The laser beam is directed at a surface 119 of the powder bed to melt at least a portion of the powder. The impinged-on portion of the powder bed cools to a hardened material, 106 as part of the 3D object.

The internal volume of the processing chamber is configured to maintain an atmosphere while the melting process occurs. For example, the walls of the processing chamber can at least partially isolate the internal atmosphere from an external environment (e.g., ambient environment). In some cases, the external environment is the environment of a room in which the printer is located. In some cases, the processing chamber is further enclosed within another environment different than the external environment. For example, the processing chamber, build module and/or additional chambers (e.g., unpacking station) may be enclosed within a larger enclosure that has its own internal environment. In some embodiments, the atmosphere within the processing chamber includes one or more inert gases, such as argon and/or nitrogen. In some cases, the walls of the processing chamber may function to protect users of the printer from contents of the atmosphere, laser beam, and/or the powder from users of the printer. For example, the walls may provide protection against the laser beam or combustible material.

The laser can be any suitable type of laser, such as a fiber laser, a solid-state laser or a diode laser. In some embodiments, the laser is configured to generate an optical power output (laser power) ranging from about 100 Watts to about 1,000 Watts. In some embodiments, the laser may be configured to generate a laser beam having a power density on the powder bed ranging from about 100 kilowatts per centimeter squared ($kW/cm^2$) to about 30,000 $kW/cm^2$ . In some embodiments, the laser is configured to generate a laser beam having peak wavelength range of about 800 nm to about 1,500 nm. In some embodiments, the laser is configured to generate a laser beam having a spot size on the powder bed having a diameter ranging from about 50 micrometers (μm) to about 500 μm.

Characteristics and/or movement of the laser beam can be modified by one or more optical elements 120, which may be situated inside or outside of the enclosure and/or processing chamber. In some embodiments, the optical elements and/or the laser are enclosed within a separate chamber (e.g., external (e.g., adjacent) to the processing chamber and part of the enclosure of the printer). The optical elements can include one or more scanners (e.g., galvanometer scanners), polygons, mechanical stages (e.g., X-Y stages), piezoelectric devices, gimbles, mirror, lenses, windows, beam splitters, and/or prisms. The scanners can be configured to direct (e.g., by deflection) the laser beam across the surface of the powder bed in accordance with a (e.g., predetermined) path. In some embodiments, the scanners are configured to provide scan speeds up to about 5 meters per second (m/s). The path can include one or more hatches, and can be in accordance with a stripe pattern, island pattern and/or chessboard pattern. The laser beam scanning may unidirectional, bidirectional, spiral and/or double scan.

The enclosure may include one or more build modules 123. A build module can be removably coupled with the processing chamber or be integrally coupled to the processing chamber. The build module can include an internal volume configured to enclose at least a portion of a platform 110 (also referred to herein as a "build platform"), which is configured to support the powder bed. In some cases, the platform includes a base 102 and/or a substrate 109. In some embodiments, the surface of the platform that supports the powder bed has an area ranging from about 100 square centimeters ($cm^2$) to about 10,000 $cm^2$. The internal volume of the build module can be configured to enclose at least a portion of an elevator 105 that is configured to move (e.g., vertically translate) the platform. In some embodiments, the platform is configured to translate in vertical steps ranging from about 20 micrometers (μm) to about 500 μm. In some embodiments, the platform is configured to support a powder bed having a height (e.g., in Z direction of FIG. 1) ranging from about 100 millimeters (mm) to about 1,000 mm. In some embodiments, one or more seals 103 enclose the powder in a selected area within the build chamber (e.g., away from the elevator). The elevator may comprise an actuator (e.g., a motor).

The build module may be removably engageable with the processing chamber. For example, the build module may be engaged with the processing chamber during a printing operation to at least partial isolate the internal volume of processing chamber from the external atmosphere. After the printing operation, the build module can be disengaged from the processing chamber. In some cases, the disengagement opens the internal volume of the processing chamber and/or the build module to the external atmosphere. In some embodiments, the build module and/or the processing chamber includes a shutter that isolates the atmosphere within the build module and/or the processing chamber upon disengagement.

Figure 2:
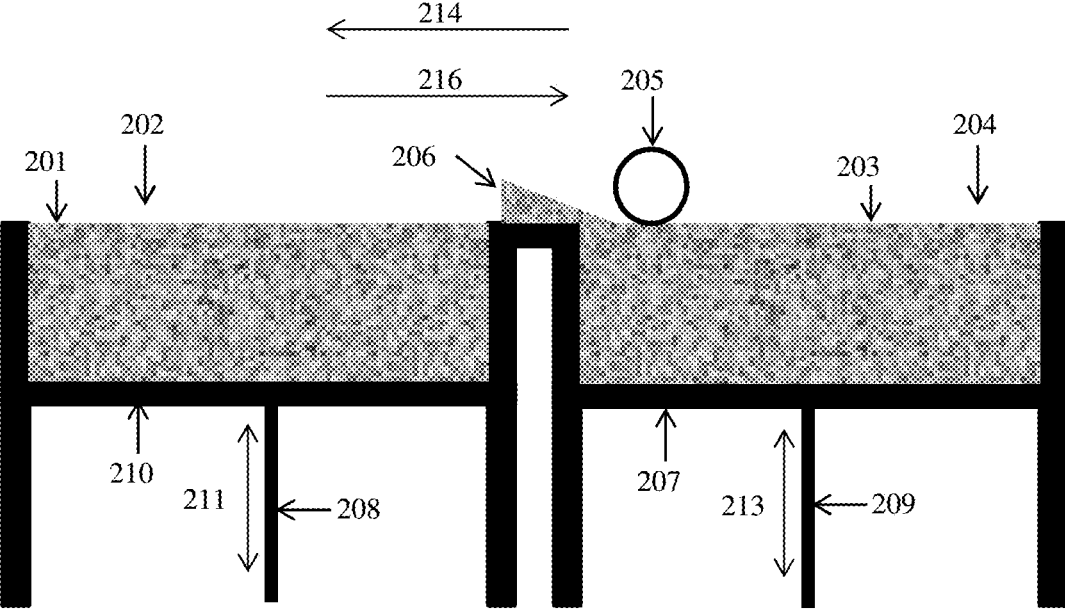
FIG. 2 schematically illustrates a section view of a portion of a 3D printer.

The 3D printer may include a layer forming devices 113 (also referred to herein as a "layer dispenser"). The layer forming device may include a powder dispenser 116 and/or a leveler 117. The leveler can include a blade or roller that contacts the powder bed to provide a level (e.g., planar) surface for the powder bed. In some embodiments, the 3D printer includes a container for holding a supply of powder (e.g., a reservoir). FIG. 2 shows a side view of an example container 204 adjacent build module 202, which includes platform 210. The platform can be (e.g., vertically) translatable 211 by an elevator 208. In some cases, the layer forming device translates and pushes a portion 206 of the powder from the container to the region above the platform. The translation can be in a first direction 214 toward a region above the platform, and in a second direction 216 toward the container (e.g., to prepare for forming a subsequent layer). In some embodiments, a second elevator 209 of the container is translatable 213 so as to translate the supply of powder (e.g., upward). The translating of the layer dispenser can be in directions (e.g., substantially) perpendicular to a translation direction 211 of the platform and/or a translation direction 213 of the support member 207 of the container. In some embodiments, the layer dispenser is configured to provide a layer of powder having a thickness ranging from about 20 micrometers (μm) to about 500 μm.

Figure 5:
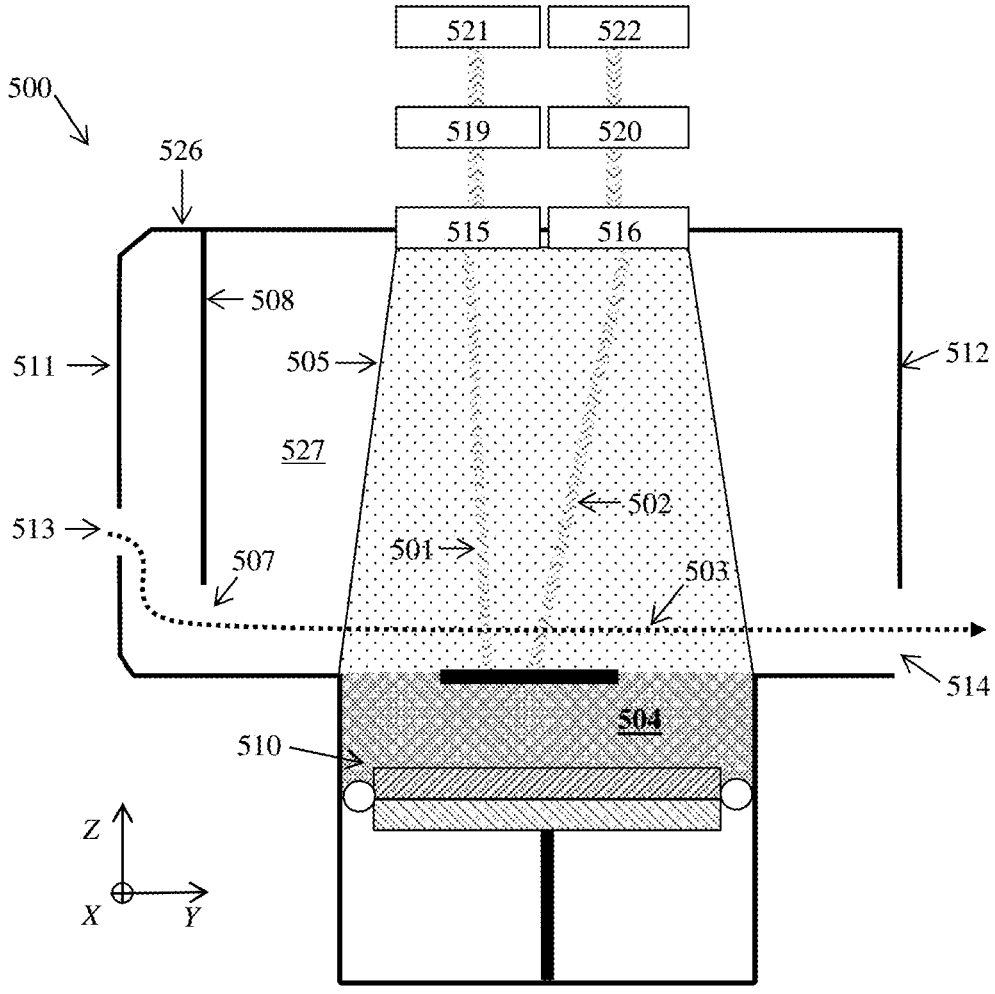
FIG. 5 schematically illustrates a section view of a portion of a 3D printer.

In some cases, the printer includes more than one laser. For example, the printer can have two, three, four, five, or more lasers. FIG. 5 shows a section view of a portion of an example printer having two lasers 521 and 522, optical elements 519 and 520 and windows 515 and 516 for directing laser beams 501 and 502 toward the powder bed 504. In some applications, at least two of the lasers are used simultaneously or sequentially (e.g., one at a time). In some applications, multiple laser beams (e.g., 2, 3, 4, or 5) are used in parallel. In some cases, at least two laser beams are scanned at different rates, and/or along different paths. For example, the movement of a first laser beam may be faster than the movement of a second laser beam. In some cases, at least two laser beams are scanned at (e.g., substantially) the same rates, and/or along (e.g., substantially) the same paths.

Figure 3:
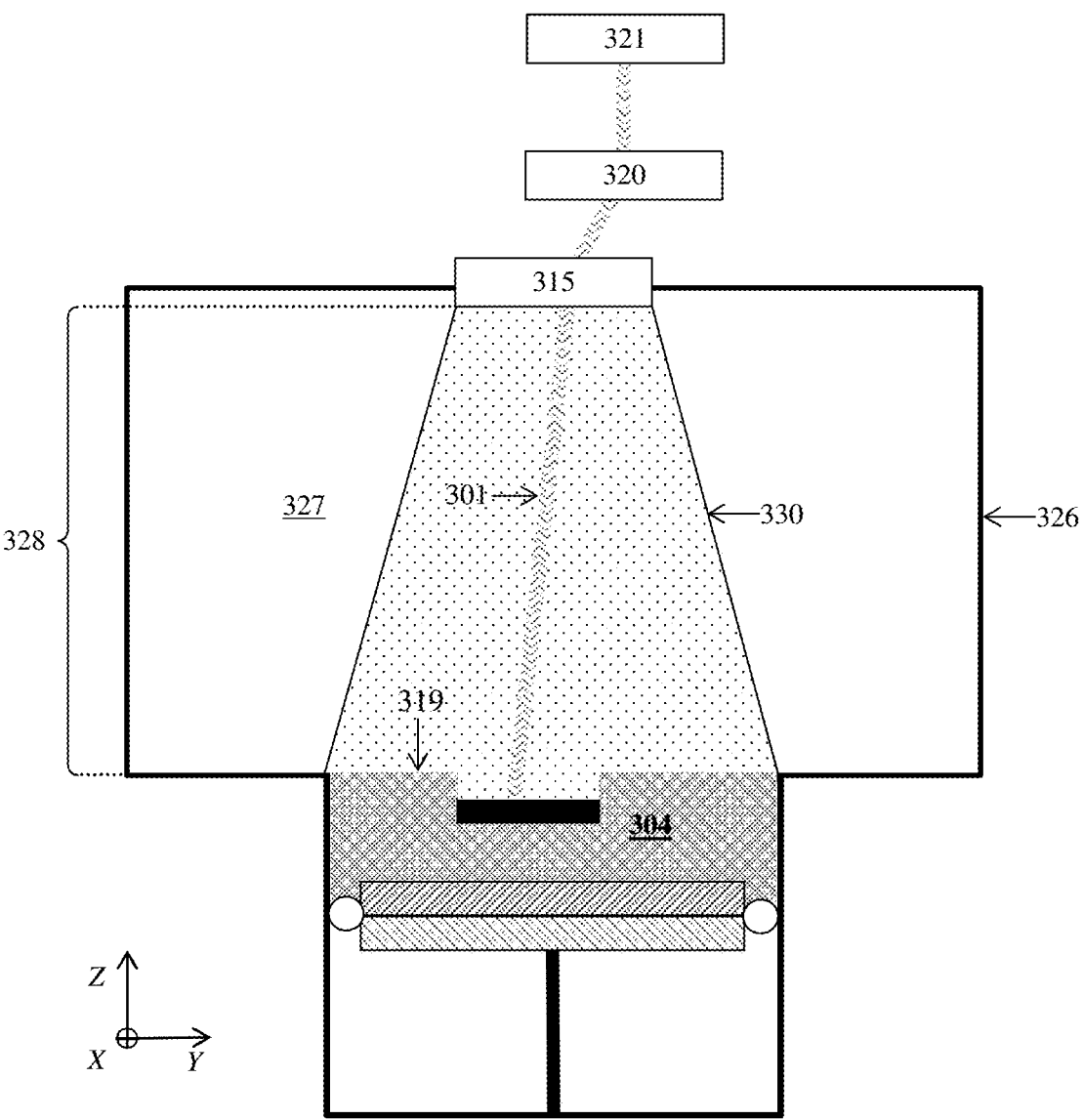
FIG. 3 schematically illustrates a section view of a portion of a 3D printer.

The laser beam(s) may travel through a region of the processing chamber referred to as a processing cone region (also referred the herein as a "processing cone"). FIG. 3 shows a cross section view of an example printer having a laser 321 that is configured to direct a laser beam 301 through a window 315 and an internal volume 327 of a processing chamber 326, towards an exposed surface 319 of a powder bed 304. One or more optical elements 320, which may include one or more scanners, can be configured to move the laser beam (e.g., by deflection) in accordance with a predetermined path along the target surface (e.g., surface 304). Movement of the laser beam(s) during a printing operation can causes the laser beam(s) to potentially occupy a volume within between the area or point of entry of the laser beam into the processing chamber (e.g., the interior surface of the window 315) and the area of the surface of the powder bed — referred to as the processing cone region 330. If multiple laser beams are used during a printing operation, the processing cone region includes the volume between the areas or points of entry of the multiple laser beams (e.g., interior surfaces of the windows) and the area of the surface of the powder bed. The height 328 of processing cone region can span a distance between the interior surface of the window 315 and the surface 319 of the powder bed. In some embodiments, the processing cone region has a height 328 ranging between about 10 centimeters (cm) and about 100 cm. In some cases, the processing cone region includes at least a portion of the powder bed. The shape of the processing cone region may vary. In some embodiments, the shape of the processing cone region is a cone, a pyramid (e.g., square pyramid), a frustum (cut-off pyramid), a cylinder, a tetrahedron, a cube or a prism (e.g., triangular prism, hexagonal prism or pentagonal prism). In some embodiments, the processing cone region has a symmetric shape (e.g., substantially symmetric about a central axis). In some embodiments, the processing cone region has a non-symmetric shape. The processing cone may have a shape depending on the motion range of the laser(s), that may depend on the shape of the platform. In addition, the laser beam 301 itself can define a volume within the processing chamber (and within the processing cone)—referred to herein as the laser beam volume. A laser beam volume can be defined as the volume encompassed by the laser beam along height 328 between the interior surface of the window 315 and the surface 319 of the powder bed.

Figure 4A:
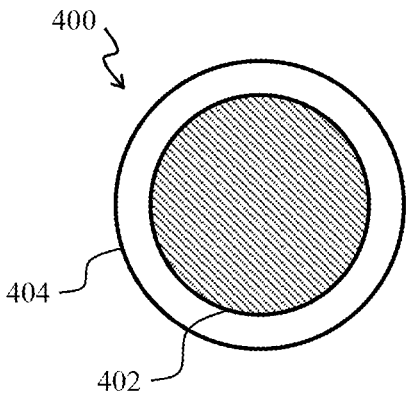
FIGS. 4A and 4B schematically illustrate section views of debris particles.
Figure 4B:
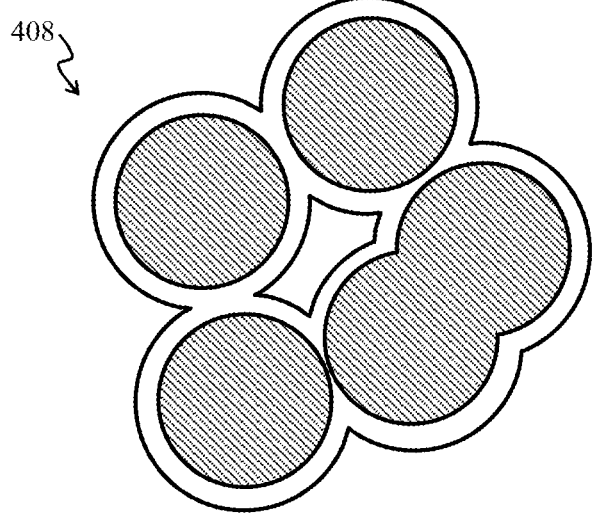

In some embodiments, melting of the powder creates debris as a byproduct. The debris may travel into the atmosphere within the processing chamber (e.g., during processing). The debris may also referred to as "gas-borne" debris. In some cases, the debris is continuously generated and expelled into the internal volume of the processing chamber during the printing. In some cases, the gas-borne debris exits the surface of the powder bed as a plume of gas-borne debris. The gas-borne debris can include particles that are melted, sintered, or partially melted or sintered. The gas-borne debris may include powder that was not transformed. The gas-borne debris can include particles of partially or fully oxidized metal (e.g., metal oxide) (also referred to herein as "soot"). The gas-borne debris may include un-melted or un-oxidized powder particles that leave the powder bed (e.g., into the atmosphere within the processing chamber). In some cases, the gas-borne debris includes particles having diameters ranging from about 0.1 micrometers (μm) to about 1 μm. The debris may comprise smaller particles (e.g., in the nanometer range). FIG. 4A shows a section view of an example soot particle 400. In some cases, the soot particles include about 70% to about 95% metal 402 (e.g., core) and about 5% to about 30% metal oxide 404 (e.g., outer shell) by volume. In some cases, the soot particles include at least about 10% metal oxide by volume. In some cases, the soot particles fuse together in clusters. FIG. 4B shows a section view of an example of a cluster of soot particles 408.

The rate of gas-borne debris production within the processing chamber can depend, in part, on the rate of melting of the powder. Melting may comprise fully melting or partially melting. Sintering may comprise partially melting. In some applications, the rate of melting is at least about 1 cubic centimeters per hour ($cm^3$/hr), 2 $cm^3$/hr, 3 $cm^3$/hr, 4 $cm^3$/hr, 5 $cm^3$/hr, 10 $cm^3$/hr, 20 $cm^3$/hr, 30 $cm^3$/hr, 40 $cm^3$/hr, 50 $cm^3$/hr, 100 $cm^3$/hr, 150 $cm^3$/hr, 200 $cm^3$/hr, 250 $cm^3$/hr, 300 $cm^3$/hr, 400 $cm^3$/hr or 500 $cm^3$/hr per laser during a printing operation. The rate of melting may range between any of the afore-mentioned values (e.g., from about 1 $cm^3$/hr to about 500 $cm^3$/hr, from about 5 $cm^3$/hr to about 100 cm³/hr, from about 100 cm³/hr to about 500 cm³/hr, or from about 1 cm³/hr to about 50 cm³/hr) during a printing operation. In some embodiments, the rate of gas-borne debris production is at least about 10 micrograms per second (μg/sec), 50 μg/sec, 100 μg/sec, 200 μg/sec, 300 μg/sec, 400 μg/sec, 500 μg/sec or 1 milligram (mg/sec) during a printing operation. In some embodiments, the rate of gas-borne debris production is at most about 50 μg/sec, 100 μg/sec, 200 μg/sec, 300 μg/sec, 400 μg/sec, 500 μg/sec, 1 mg/sec, or 5 mg/sec during a printing operation. The rate of gas-borne debris production may range between any of the afore-mentioned values (e.g., from about 10 μg/sec to about 5 mg/sec, from about 300 μg/sec to about 5 mg/sec, from about 10 μg/sec to about 300 μg/sec, or from about μg/sec to about 100 μg/sec) during a printing operation.

Sometimes, the gas-borne debris within the processing cone can interfere with the effectiveness of the laser beam(s). For example, the gas-borne debris may absorb, reflect and/or diffract some of energy of the laser beam so that its intensity, spot size and focus is affected by the time the laser beam reaches the powder bed. This can cause inconsistencies in the intensity, focusing, and/or spot size of the laser beam during the printing operation, which can in turn manifest as and/or contribute to inconsistencies in the 3D object. In some cases, the inconsistencies include density inconsistencies (e.g., porosity) and/or surface roughness on the 3D object surface(s).

The printing system can include features to address or compensate for the gas-borne debris within at least the processing cone region. In some embodiments, the laser(s) can be configured to adjust various aspects of the laser beam (e.g., comprising intensity, cross-section, or speed) in con-junction with the debris concentration at least the processing cone region (e.g., within the processing chamber). For example, the various aspects of the laser beam may be adjusted during the printing operation (e.g., in real time). The adjustments may be made using one or more controllers. The controller may comprise a feedback or feedforward control scheme. The controller may comprise a closed loop or open loop control scheme. One or more sensors (e.g., within or outside of the processing chamber) may provide feedback to the one or more controllers when the debris concentration reaches a threshold value. The one or more controllers can then cause the laser(s) to adjust one or more of the various aspects of the laser beam(s) accordingly (e.g., such as increase or decrease the intensity of the laser beam(s)). In some cases, the one or more controllers are configured to cause the one or more optical elements to adjust the depth of field (i.e., effective focus range) of the laser beam(s) based on input from the one or more sensors.

In some embodiments, the gas-borne debris within the processing cone region is reduced by allowing a gas (e.g., an inert gas, or an external atmosphere) to enter the internal volume of the processing chamber. The gas can displace (purge) at least some of the gas-borne debris, thereby reducing its concentration in the processing cone region. In some embodiments, the purging gas enters the processing chamber when the build module is separated from the processing chamber. The purging gas may be allowed to enter during or after a printing operation (e.g., between builds). The external atmosphere may be allowed to enter during or after a printing operation (e.g., between builds).

In some cases, the printer includes a gas flow system that introduces a flow of gas that moves the gas-borne debris within at least the processing cone (e.g., within the process-ing chamber) during a printing operation. FIG. 5 shows a section view of a portion of an example printer having an enclosure 500 that includes a gas flow system. The gas flow system can include an inlet region 511, which includes one or more inlet ports 513 that is/are operationally coupled with a gas source. The gas source may provide an inert gas, such as nitrogen and/or argon. The inert gas may be (e.g., substantially) non-reactive (e.g., non-chemically reactive) with the powder during a printing operation. In some embodiments, the inlet region includes a wall 508 that separates the inlet region from the internal volume 527 of the processing chamber 526. The gas can enter the inlet region at the one or more inlet ports and exit the inlet region via one or more inlet openings 507. In some embodiments, the one or more inlet ports correspond to the one or more inlet openings (e.g., no wall 508). The inlet region can include any suitable number of inlet ports and/or inlet openings (e.g., 1, 2, 3, 4, 5, 6, 7, 8, 9, or 10). In some embodiments, the inlet ports and/or inlet openings correspond to openings within a perforated plate, a screen, a mesh and/or a gas permeable material.

The gas flow system can include an outlet region 512, which includes one or more outlet openings 514 for the flow of gas to exit the processing chamber. In some cases, the gas may flow through the processing chamber toward the outlet openings due to a pressure difference between the inlet and outlet regions. In some cases, the one or more outlet open-ings (e.g., fluidly) coupled one or more pumps that assist movement of the gas through the processing chamber. The pump(s) may include a positive displacement pump (e.g., rotary) and/or a vacuum pump (e.g., Venturi). The one or more outlet openings can be operationally coupled with a gas recycling system that recycles the gas back through the one or more inlet ports (e.g., after filtering out debris). The outlet region can include any suitable number of outlet openings (e.g., 1, 2, 3, 4, 5, 6, 7, 8, 9, or 10). In some embodiments, the one or more outlet openings correspond to openings within a perforated plate, a screen, a mesh and/or a gas permeable material. The inlet and outlet regions can be coupled to any wall of the processing chamber. For example, the inlet and/or outlet regions may be coupled to side walls, a ceiling (e.g., adjacent to the windows 515 and 516), and/or a floor (e.g., adjacent to the platform 510) of the processing chamber.

In some embodiments, the inlet port(s), inlet opening(s), and/or outlet opening(s) are operationally coupled to one or more valves and/or nozzles. The valve(s) and/or nozzle(s) can control an amount (e.g., on or off) and/or a velocity of the flow of gas into the processing. The valve(s) and/or nozzle(s) may be controlled manually or automatically (e.g., using one or more controllers). The nozzle(s) may include jet (e.g., gas jet) nozzle, high velocity nozzle, propelling nozzle, magnetic nozzle, spray nozzle, vacuum nozzle, Venturi nozzle, or shaping nozzle (e.g., a die). The nozzle can be a convergent or a divergent nozzle. The spray nozzle may comprise an atomizer nozzle, an air-aspirating nozzle, or a swirl nozzle.

According to some embodiments, the inlet and outlet regions are positioned so as to provide a flow of gas 503 through at least a portion of the processing cone 505. The debris being generated at the surface of the processing cone can become entrained with the flow of gas and exit the processing chamber via the outlet region. In some cases, the inlet region is along one side wall of the processing chamber, and the outlet region is along an opposing side wall of the processing chamber. In this way, the flow of gas can travel along the surface of the powder bed across a width or length of the processing chamber. In some cases, the inlet region is along a ceiling (e.g., top wall) of the processing chamber (e.g., adjacent to window 515 or 516) and the outlet region is along one or more side walls of the processing chamber. In this way, a first portion of the flow of gas can travel toward the powder bed and a second portion of the flow of gas can travel along the surface of the powder bed. At least a portion of the flow of gas can be (e.g., substantially) parallel to the surface of powder bed. A substantially parallel flow of gas can be in a direction that is about 0 degrees (°), 1°, 5°, 10°, 20°, 30° or 40° relative to the exposed surface of the powder bed and/or the platform. In some embodiments, at least a portion of the flow of gas is (e.g., substantially) laminar to reduce turbulence near the powder bed, for example, just above the exposed surface and/or within the processing cone.

Figure 6:
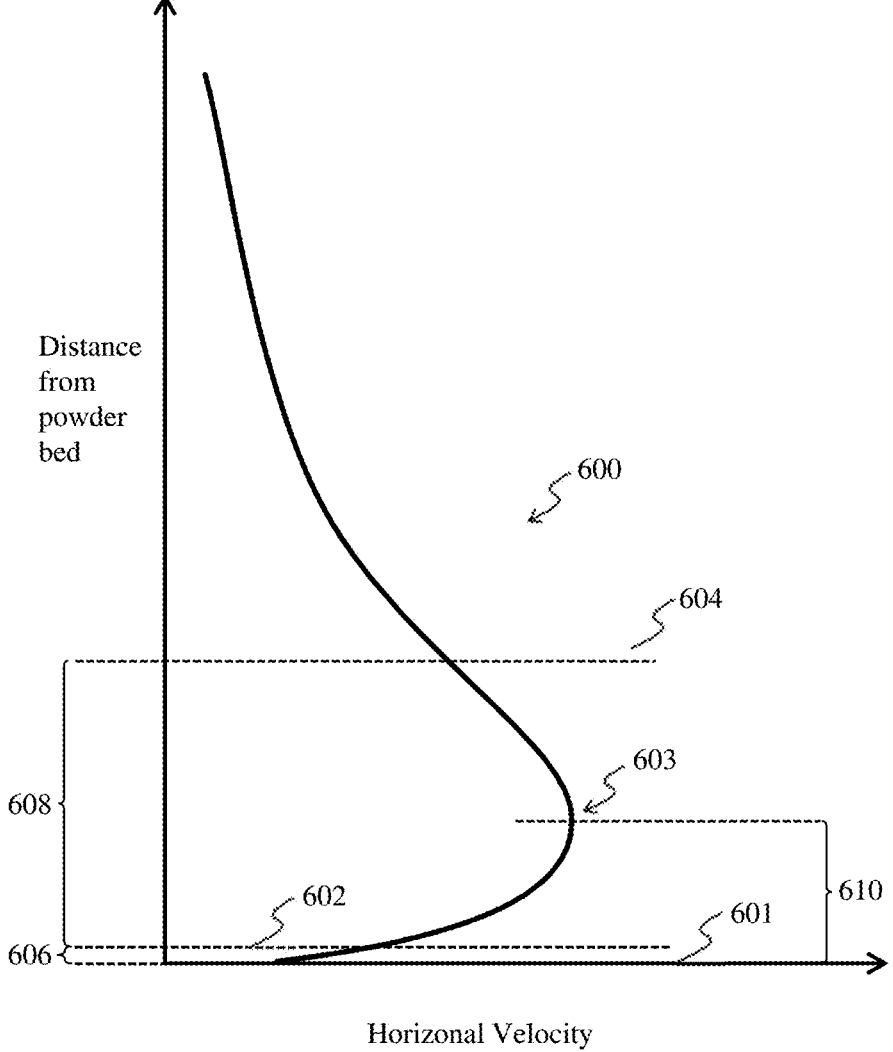
FIG. 6 illustrates a graph indicating gas flow parameters.

In some embodiments, at least a portion of the flow of gas is in a (e.g., substantially) horizontal direction. A substantially horizontal flow of gas can be in a direction that is about 60°, 80°, 85°, 89° or 90° with respect to a gravity vector. FIG. 6 shows a profile 600 indicating horizontal (e.g., lateral) gas flow velocity within a processing chamber as a function of distance from a surface 601 of the powder bed, in accordance with some embodiments. The horizontal gas flow can have a peak velocity 603 at a peak velocity height 610 in relation to the exposed surface 601 of the powder bed. The peak velocity height 610 can vary depending on a number of factors including the heights of the inlet and outlet openings and/or the lateral distance along the length of the powder bed and/or the platform. The peak velocity height 610 can be within a powder bed proximity zone 608. The powder bed proximity zone corresponds to a section of the processing chamber and/or the processing cone region between a height 602 of a boundary layer and a prescribed distance 604 from the surface of the powder bed. In some embodiments, the peak velocity height 610 is (e.g., substantially) equidistant (e.g., midway) between the height 602 of a boundary layer and the prescribed distance 604. The boundary layer 606 refers to a region immediately above the surface of the powder bed where effects of viscosity may be significant and horizontal velocity across the powder bed may be relatively low. In some embodiments, the height 602 of the boundary layer is at most about 1 mm, 2 mm, 3 mm, 4 mm, 6 mm, 7 mm, 8 mm, or 9 mm, 10 mm from the surface of the powder bed.

The prescribed distance 604 and the height 608 of the powder bed proximity zone may vary in accordance with the peak velocity height 610. In some embodiments, the prescribed distance 604 is at least about 5 mm, 6 mm, 7 mm, 8 mm, 9 mm, 10 mm, 12 mm, 15 mm, 20 mm, 30 mm, 40 mm, 50 mm, 60 mm, 70 mm, 80 mm, 90 mm, 100 mm, 120 mm, 150 mm or 200 mm from the exposed surface of the powder bed and/or platform. The powder bed proximity zone 608 can range between any of the afore-mentioned values of boundary layer height and prescribed distance (e.g., from about 1 mm to about 200 mm, from about 1 mm to about 30 mm, from about 30 mm to about 200 mm, from about 15 mm to about 50 mm, or from about 15 mm and about 100 mm) above the surface of the powder bed and/or platform.

In some cases, the flow of gas is continuously provided during a printing operation. In some cases, the flow of gas is provided during only a portion of the printing operation. In some cases, the velocity of the flow of gas remains (e.g., substantially) the same during the printing operation, or during a portion of the printing operation (e.g., during laser irradiation for melting). In some cases, the velocity of the flow of gas is varied during the printing operation, or during a portion of the printing operation. One or more valves of the inlet port(s), inlet opening(s) and/or outlet opening(s) can be used to control the velocity and or amount (e.g., on/off) of the flow of gas. In some cases, the velocity (i.e., volumetric flow rate) of the flow of gas through the powder bed proximity zone is at least about 0.01 m/s, 0.05 m/s 0.1 m/s, 0.5 m/s, 1 m/s, 2 m/s, 3 m/s, 5 m/s, 10 m/s, 15 m/s, 20 m/s, 30 m/s or 50 m/s. The velocity of the gas flow through the powder bed proximity zone can be at most about 0.1 m/s, 0.2 m/s, 0.3 m/s, 0.5 m/s, 0.7 m/s, 0.8 m/s, 1 m/s, 2 m/s, 3 m/s, 5 m/s, 10 m/s, 15 m/s, 20 m/s, 30 m/s or 50 m/s. The velocity of the gas flow through the powder bed proximity zone can be between any of the afore-mentioned values (e.g., from about 0.01 m/s to about 50 m/s, from about 0.01 m/s to about 2 m/s, from about 2 m/s to about 50 m/s, or from about 0.2 m/s to about 2 m/s). The velocity can be measured using any suitable technique(s) and device(s). For example, one or more flow meters (e.g., anemometer, sonar flow meter, air flow meter or particle image velocimetry device or laser Doppler velocimetry device) may be used to measure the gas flow velocity across one or more prescribed distances above the surface of the powder bed. For example, a sensor used in an flow meter may measure gas flow velocity at a height within the powder bed proximity zone.

Figure 7:
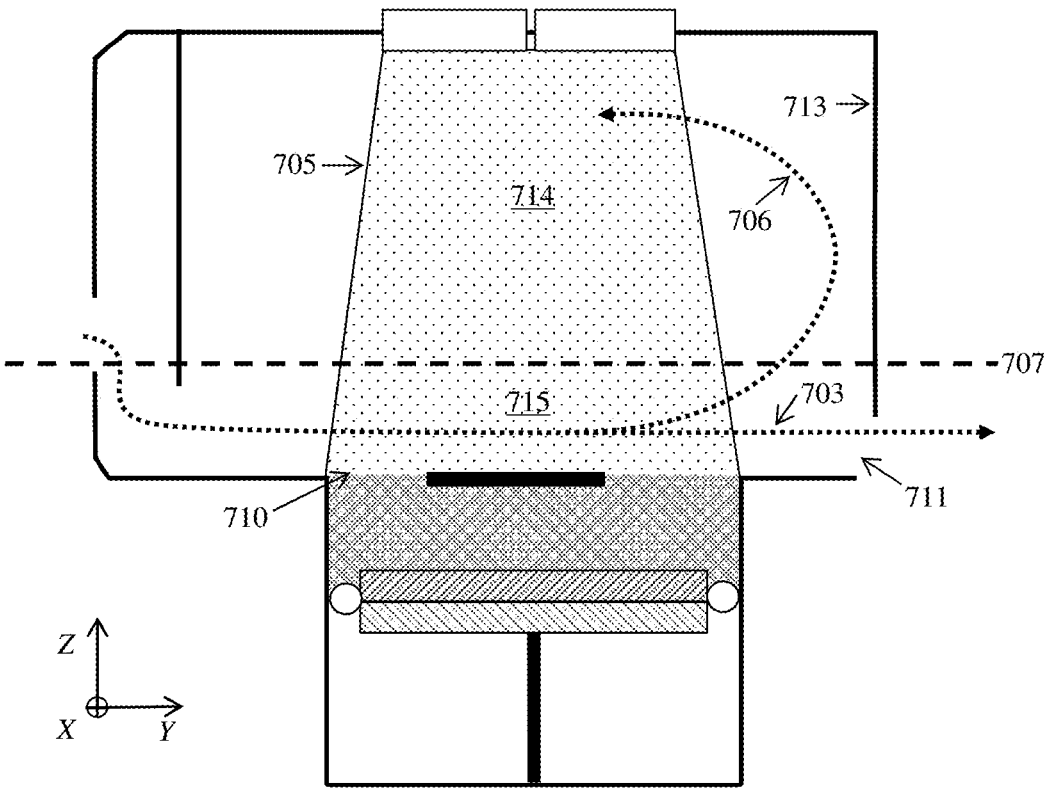
FIG. 7 schematically illustrates a section view of a portion of a 3D printer.

Although the flow of gas can reduce an overall debris concentration within the processing chamber, some of the gas flow may recirculate and redistribute some gas-borne debris within the processing chamber. FIG. 7 shows a section view of an example printer where a first portion 703 of the flow of gas exits the processing chamber via the outlet opening(s) 711, and a second portion 706 of the flow of gas recirculates back into the processing chamber. An internal shape of the processing chamber may be configured to facilitate the movement of the gas-borne debris. For example, a wall 713 (e.g., a side wall) of the processing chamber may facilitate movement of the second portion 706 of the flow of gas back toward the processing cone 705. The recirculating flow of gas can be referred to as a backflow. In some embodiments, the recirculating flow is in accordance with a turbulent movement (e.g., within the processing cone region). The turbulent movement can include a cyclic movement and/or a standing vortex. The recirculation can be in a region 714 of the processing chamber (and the processing cone) above the powder bed proximity zone 715. For example, the region 714 can be a distance 707 that is at least about 5 mm, 6 mm, 7 mm, 8 mm, 9 mm, 10 mm, 12 mm, 15 mm, 20 mm, 25 mm, 40 mm, 50 mm or 60 mm above the surface of the powder bed.

The flow of gas can be used to maintain a concentration of debris within the processing chamber, processing cone (e.g., region 714) and/or the laser beam volume below a prescribed concentration or within a range of concentrations during the printing. For example, the region 714 above the powder bed and/or the laser beam volume may include gas-borne debris within a certain concentration. The concentration of debris may be measured based on weight per volume (e.g., milligrams per cubic meter) or debris particles per volume (e.g., particles per cubic centimeter or particles per laser beam volume). In some embodiments, the flow of gas is used to maintain a debris concentration of at most about 1 milligrams per cubic meter ($mg/m^3$), 10 $mg/m^3$ 50 $mg/m^3$, 100 $mg/m^3$, 200 $mg/m^3$, 300 $mg/m^3$, 400 $mg/m^3$, 500 $mg/m^3$, 1,000 mg/m 3 or $mg/m^3$ within the region 714 above the powder bed during printing. The flow of gas can maintain a debris concentration ranging between any of the aforementioned values (e.g., from about 1 mg/m 3 to about 5,000 $mg/m^3$, from about 300 mg/m 3 to about 5,000 $mg/m^3$, from about mg/m 3 to about 300 $mg/m^3$, or from about 1 mg/m$^3$ to about 1,000 mg/m$^3$) within the region 714 above the powder bed during printing. In some embodiments, the flow of gas is used to maintain a concentration of debris particles having diameters of about 0.5 micrometers or greater of at most about 0.1, 0.5, 1, 50, 100, 200, 300, 400, 500, 1,000, 2,000, 3,000, 4,000 or particles per cubic centimeter (cm$^3$) within the region 714 above the powder bed during printing. The flow of gas can maintain a concentration debris particles having diameters of about micrometers or greater ranging between any of the aforementioned values (e.g., from about to about 5,000 particles per cm$^3$, from about 0.1 to about 500 particles per cm$^3$, from about 500 to about 5,000 particles per cm$^3$, or from 0.5 to about 1,000 particles per cm$^3$) within the region 714 above the powder bed during printing. In some embodiments, the flow of gas is used to maintain a number of debris particles having diameters of about 0.5 micrometers or greater encountered by each laser beam (i.e., concentration within the laser beam volume) of at most about 1, 5, 10, 50, 100, 500, 1,000, 5,000, 10,000, 20,000 or 50,000 particles during printing. The flow of gas can maintain a number of debris particles having diameters of about 0.5 micrometers or greater encountered by each laser beam between any of the aforementioned values (e.g., from about 1 to about 50,000 particles, from about 1 to about 1,000 particles, from about 1,000 to about 50,000 particles, or from about 10 to about 10,000 particles) during printing.

During printing, the debris concentration within the powder bed proximity zone may fluctuate since gas-borne debris may continuously be formed and carried away by the flow of gas. Thus, at any given moment, the debris concentration within the powder bed proximity zone 715 may differ (e.g., be higher or lower) than the region 714 above the powder bed proximity zone.

In some embodiments, the maintained debris concentration range (e.g., at least above the powder bed proximity zone) may allow for printing of a 3D object having a porosity no greater than about 1% by volume and/or a surface roughness (Ra) no greater than about 50 micrometers. Porosity can refer to the volume of voids as a percentage of a total volume of the 3D object. Surface roughness (Ra) can correspond to the arithmetic average of the absolute values of the profile height deviations from the mean line, recorded within the evaluation length, in accordance with American Society of Mechanical Engineers (ASME) B46.1 standards. In some applications, the surface roughness is measured along a surface of the 3D object that is at a prescribed angle in relation to the exposed surface of the powder bed and/or the support surface of the platform. For example, in some applications, it may be challenging to form a smooth surface on a 3D object that is (e.g., substantially) normal to the exposed surface of the powder bed and/or the support surface of the platform during printing. This can be due to dynamics related to the melting process. In some embodiments, the surface roughness is measured along a surface of the 3D object that is at an angle ranging from about 85 degrees to about 120 degrees in relation to the powder bed and/or the support surface of the platform during the printing.

Figures 8A, 8B:
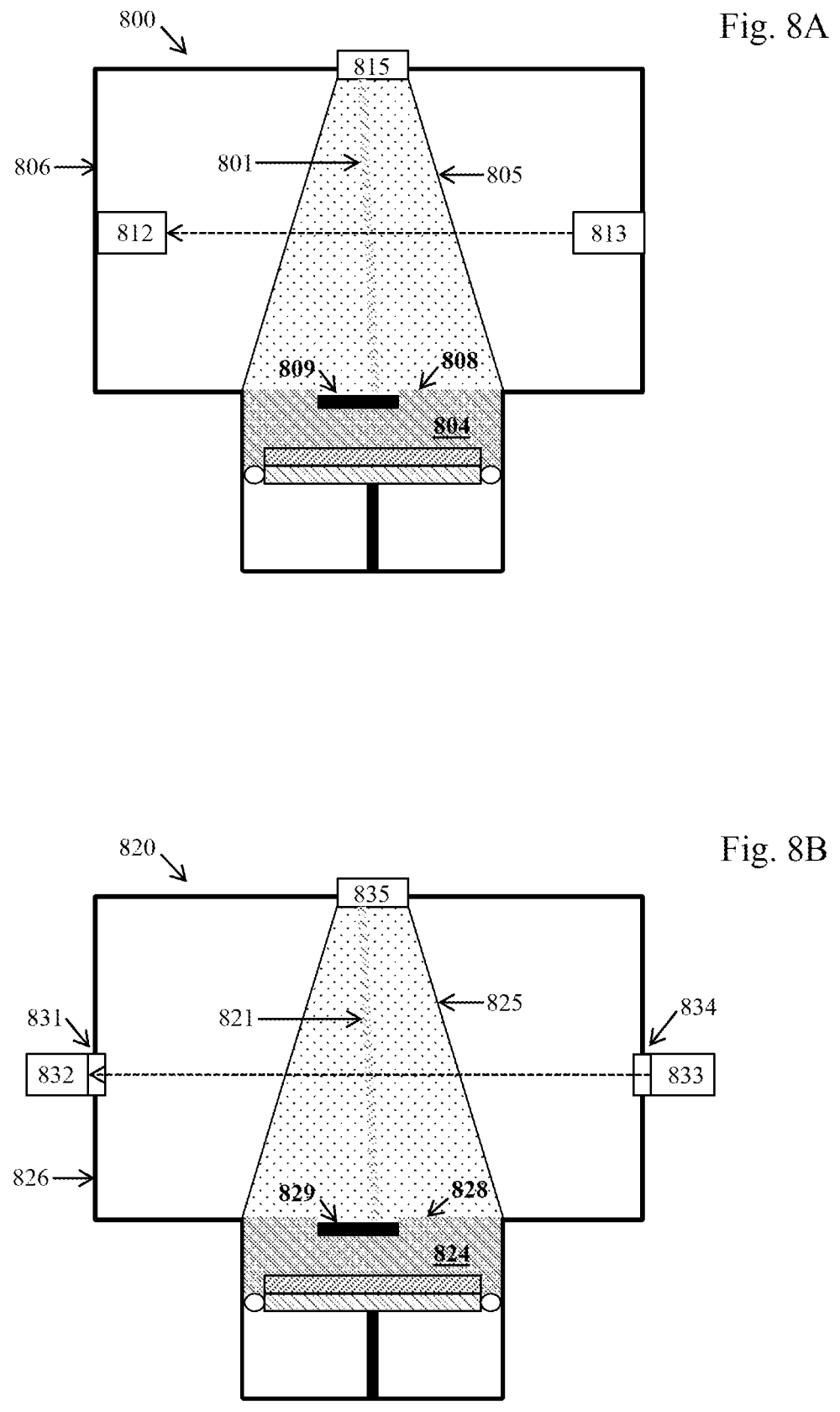

The debris concentration within the processing chamber (e.g., within and/or above the powder bed proximity zone of the processing cone region) can be measured using any suitable technique(s) and device(s). The debris concentration measuring devices may or may not be part of the printer. In some embodiments, the debris measuring device includes one or more emitters and/or one or more sensors (e.g., receivers). The emitter(s) may emit radiation, such as sound, charge and/or electromagnetic radiation (e.g., light (e.g., laser beam)). The sensor(s) can be configured to detect and/or receive the emitted radiation and/or changes in the emitted radiation. FIGS. 8A and 8B show section views of portions of example printer enclosures 800 and 820, respectively, with debris measuring devices. In FIG. 8A, an emitter 813 emits radiation through the processing chamber 806, including the processing cone region 805, and detected by a sensor 812, where the emitter and sensor are located inside the processing chamber. In FIG. 8B, an emitter 833 emits radiation through a first window 834, the processing cone region 805, a second window 831, and to a sensor 832, where the emitter and sensor are located outside the processing chamber 826. The first and second windows can be dedicated to the use of the emitter and sensor, or can be used for other purposes. The position of the receiver and emitter relative to the exposed surface of the powder bed may be adjustable. The emitter(s) and or sensor(s) can be configured to detect the debris concentration within a certain portion of the processing cone. For example, the emitter(s) and or sensor(s) can be located a height above the surface (e.g., FIG. 8A, 808 or FIG. 8B, 828) of the powder bed (FIG. 8A, 804 or FIG. 8B, 824) that is within the debris concentration zone of the processing cone. In some embodiments, the sensor(s) and/or emitter(s) are operatively coupled a particle counter (e.g., optical particle counter) that is used to determine the concentration of debris particles within the processing chamber, processing cone region and/or within the path of the laser beam (e.g., FIG. 8A, 801 or FIG. 8B, 821). The particle counter can be configured to count debris particles above a prescribed diameter (e.g., above about 0.1 micrometer (μm), 0.5 μm, 1 μm or 5 μm). The particle count can be analyzed using any methodology (e.g., in accordance with U.S. Federal Standard 209E or ISO 14644-1 for cleanrooms). In some embodiments, a condensation particle counter, a differential mobility particle sizer, a scanning mobility particle sizer analyzer, a fast mobility particle sizer, an electric low pressure impactor and/or a tapered element oscillating analyzer, is used. In some cases, the debris concentration within laser beam(s) (e.g., laser beam(s)) is/are detected and analyzed using dark field analysis, where energy (e.g., light) that is unscattered by the debris particles is excluded from the image. In some cases, the debris concentration is determined using a thermal signal (e.g., black body radiation) of the laser beam(s) and/or emerging from the powder bed. In some embodiments, changes in the light intensity of certain portions of the laser beam, as reflected off a reflective surface (e.g., mirror or internal surface of the processing chamber wall (e.g., side wall)), are measured. In some embodiments, samples of the atmosphere within portions of the processing chamber are collected and analyzed (e.g., weighed) to calculate the concentration of debris (e.g., based on a calculated volume of gas through the processing chamber). In some embodiments, the gas-borne debris is collected in one or more filters operatively coupled to the processing chamber. The material collected in the filter can be analyzed (e.g., weighed) to calculate the concentration of debris (e.g., based on a calculated volume of gas through the processing chamber).

In some embodiments, the temperature of the flow of gas to the processing chamber and/or processing cone region may be controlled. For example, the gas may be heated and/or cooled before, or during the time it flows into the processing chamber and/or processing cone region. For example, the gas may flow through a heat exchanger and/or heat sink. The gas may be temperature controlled outside and/or inside the processing chamber. The gas may be temperature controlled at least one inlet to the processing chamber. In some embodiments, the temperature of the atmosphere in the processing chamber and/or processing cone region may be kept (e.g., substantially) constant. Substantially constant temperature may allow for a temperature fluctuation (e.g., error delta) of at most about 15 degrees Celsius (° C.), 12° C., 10° C., 5° C., 4° C., 3° C., 2° C., 1° C., or 0.5° C.

The 3D printers described herein can include one or more controllers that are operatively coupled with one or more components of the 3D printer, which one or more controllers direct(s) operation of the one or more components. In some cases, the controller(s) control the motion of one or more components. The one or more controllers can be part of a control system. The control system may be able to receive signals relating to the one or more components to be used (e.g., in feedback and/or closed loop control schemes). The operations can before, during and/or after a printing operation. For example, the controller(s) may direct the engagement and/or disengagement of the build module with the processing chamber. The controller(s) may direct transiting the build module to an unpacking station. The controller(s) may direct movement (e.g., vertical translation) of the platform. The controller(s) can direct the one or more lasers to generate the one or more laser beams (e.g., laser beams). The controller(s) may regulate the one or more aspects of the laser beams (e.g., wavelength range, laser power, power density, speed, dwell time, intermission time, focus, cross-section, pulsing frequency, or irradiating as a continuous beam). The controller(s) may control the position(s) of the one or more laser beams with respect to the platform (e.g., control the trajectory of the energy beam). For example, the controller(s) may control the optical element(s) (e.g., scanners). The controller(s) may control the operation of one or more valves of the printer (e.g., for controlling the flow of gas), such as by directing the valve(s) to open or close based on predetermined conditions. The controller(s) may control the velocity of the flow of gas within the processing chamber (e.g., via the valve(s) or nozzle(s)). The controller(s) may control the operation of one or more sensors of the printer (e.g., for sensing a pressure within the processing chamber), such as by directing the sensors to turn on or off based on predetermined conditions. The sensor may be position sensors to determine positions of one or more of the components (e.g., vertical position of the platform). The controller(s) may control the operation of the layer forming device (e.g., any of its components), such as by directing movement (e.g., translation) of the layer forming device. The controller(s) may control the operation of the one or more pumps, such as by directing the pump(s) to turn on or off based on predetermined conditions. The controller(s) may control locking and/or unlocking of doors and/or windows of the enclosure (e.g., processing chamber). The controller(s) may control aspects of software of the printer (e.g., printing directions). The controller may direct operations based on a control scheme (e.g., feedback and/or feedforward control). The control may direct operations based open loop control and/or closed loop control scheme.

The 3D printer can include any suitable number of controllers, and can be used to control any number of suitable (e.g., different) operations. For example, in some embodiments, one or more controllers is used to control one or more components and another one or more controllers is used to control another one or more components. In some embodiments, a number of controllers are used to control one component. In some embodiments, a controller (e.g., a single controller) used to control a number of components.

For example, in some embodiments, one or more controllers is used to control the laser(s), and another one or more controllers is used to control aspects of the flow of gas (e.g., velocity).

Figure 9:
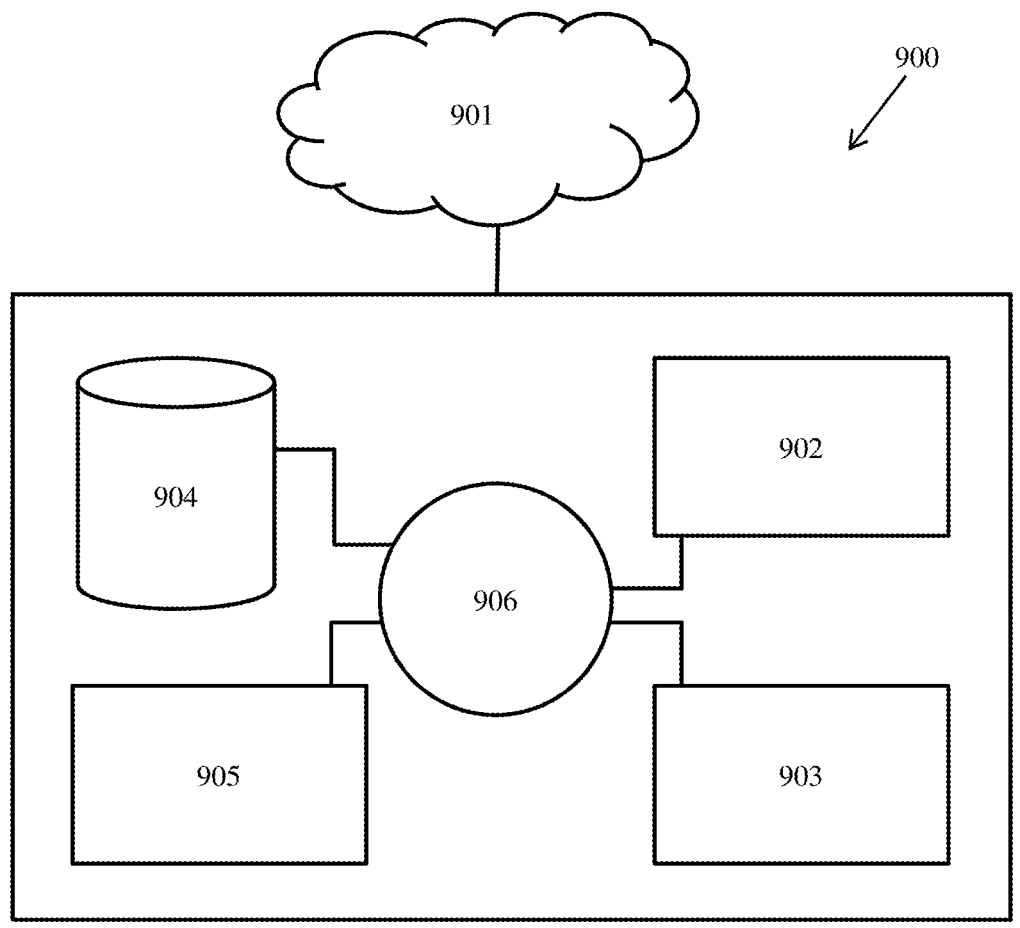
FIG. 9 schematically illustrates a computer system.

The printers described herein can include, or be in communication with, a computer system that may be operatively coupled to the one or more controllers. FIG. 9 schematically illustrates a computer system 900 in accordance with some embodiments. The computer system can include a processing unit (e.g., FIG. 9, 906) (also referred to herein as a "processor," "computer" or "computer processor"), a memory (e.g., FIG. 9, 902) (e.g., random-access memory, read-only memory, flash memory), an electronic storage unit (e.g., FIG. 9, 904) (e.g., hard disk), communication interface (e.g., FIG. 9, 903) (e.g., network adapter) for communicating with one or more other systems, and peripheral devices (e.g., FIG. 9, 905), such as cache, other memory, data storage and/or electronic display adapters. The memory storage unit interface, and peripheral devices can be in communication with the processing unit through a communication bus, such as a motherboard. The storage unit can be a data storage unit (or data repository) for storing data. The computer system can be operatively coupled to a computer network ("network") (e.g., FIG. 9, 901) with the aid of the communication interface. Instructions may be stored in the memory and can be directed to the processing unit, which can subsequently program or otherwise configure the processing unit to implement methods described herein. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet. The computer system can communicate with one or more remote computer systems through a network. For instance, the computer system can communicate with a remote computer system of a user (e.g., operator). Examples of remote computer systems include personal computers, tablet computers, telephones, smart phones, or personal digital assistants. Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the processor can execute the code. In some cases, the code can be retrieved from the storage unit and stored on the memory for ready access by the processor. In some situations, the electronic storage unit can be precluded, and machine-executable instructions are stored on the memory.

The printers described herein can include one or more power supplies to supply power to any of the components. The power can be supplied by a grid, generator, local, or any combination thereof. The power supply can be from renewable or non-renewable sources. The renewable sources may comprise solar, wind, hydroelectric, or biofuel. The power supply can comprise rechargeable batteries.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for three-dimensional (3D) printing a 3D object, the apparatus comprising:
one or more controllers configured to:
(i) couple to a power source;
(ii) operationally coupled with the elevator, the layer forming device, the one or more galvanometer scanners, and the couple with a gas flow system of a 3D printer; and
(iii) the gas flow system to provide flow of gas such that during the printing (A) the flow of the gas is across at least a portion of a processing cone region of an energy beam, the processing cone being in a processing chamber in which the 3D object is printed from a powder bed using the energy beam, and (B) the flow of the gas (I) is maintained at a debris concentration of from about one milligrams per cubic meter to about a thousand milligrams per cubic meter (a) in the processing cone region and (b) at least about 20 millimeters above a surface of the powder bed, (II) maintains a debris concentration for debris particles having a fundamental length scale of at least about 0.5 micrometers at a concentration of about 0.5 particles per cubic centimeter to about 1,000 particles per cubic centimeter, (III) a number of debris particles having the fundamental length scale of at least about 0.5 micrometers encountered by the energy beam is from about 10 to about 10,000,
wherein the 3D printing results in the 3D object comprising elemental metal or metal alloy, the 3D object having a porosity of at most about one percent (1%) by volume.

2. The apparatus of claim 1, wherein during the printing, the one or more controllers are configured to direct the gas flow system to facilitate movement of the debris at least in the processing cone region; optionally wherein the movement of the debris corresponds to a turbulent movement at least in the processing cone region; and optionally wherein the turbulent movement comprising a cyclic movement.

3. The apparatus of claim 2, wherein the one or more controllers are configured to direct the gas flow system to facilitate the turbulent movement comprising a backflow or a standing vortex.

4. The apparatus of claim 1, wherein an internal shape of the processing chamber is configured to facilitate movement of the debris.

5. The apparatus of claim 1, wherein a wall of the processing chamber is configured to facilitate movement of the debris.

6. The apparatus of claim 5, wherein the wall of the processing chamber is a side wall.

7. The apparatus of claim 1, wherein the one or more controllers are configured to direct the gas flow such that it has a peak horizontal velocity height that varies along a lateral length of the powder bed and/or a platform supporting the 3D object during the printing.

8. The apparatus of claim 1, wherein the debris concentration within the at least the portion of the processing cone region varies during the printing.

9. The apparatus of claim 1, wherein the debris within the processing chamber is formed during transformation of at least the portion of the powder bed to a transformed material as part of the 3D object.

10. The apparatus of claim 1, wherein the debris concentration is present at a height of at least about 30 millimeters above the surface of the powder bed.

11. The apparatus of claim 1, wherein the debris concentration is present at a height of at least about 50 millimeters above the surface of the powder bed.

12. The apparatus of claim 1, wherein the gas flow system is configured to provide at least a portion of the flow of the gas in a direction that is substantially parallel to the surface of the powder bed and/or to a platform configured to support the 3D object during the 3D printing; and optionally wherein the flow of gas has a peak horizontal velocity ranging from about 0.2 to about 2 meters per second (m/s).

13. The apparatus of claim 1, wherein the flow of gas has a peak horizontal velocity within a height of about 15 and about 100 millimeters (mm) above the surface of the powder bed and/or above a platform configured to support the 3D object during the 3D printing.

14. The apparatus of claim 1, wherein the energy beam is configured to generate a laser beam having a power density ranging from about 100 Kilo Watts per centimeter squared ($kW/cm^2$) to about 30,000 kW/cm, as measured at the surface of the powder bed.

15. The apparatus of claim 11, further comprising an optical system configured to modify at least one characteristic of the energy beam, wherein the optical system is configured to generate a focused or a defocused energy beam at the surface of the powder bed.

16. The apparatus of claim 1, wherein during the printing, the gas flow system is configured change a velocity of the flow of gas within the processing chamber during the 3D printing.

17. The apparatus of claim 1, wherein the debris particles comprise at least about 10% metal oxide measured as volume per volume.

18. The apparatus of claim 1, wherein during the 3D printing, the one or more controllers are configured to operatively coupled to the energy beam and direct the energy beam to transform least about cubic centimeter per hour ($cm^3/hr$) of the molten material per laser.

19. A method of 3D printing, the method comprising: (a) providing the apparatus of claim 1, and (b) using the apparatus to print the 3D object.

20. Non-transitory computer readable program instructions that, when read by one or more processors operatively coupled to the energy beam, cause the one or more processors to execute one or more operations comprising operation (c) of claim 1, the program instructions being inscribed on at least one non-transitory computer readable medium.

\* \* \* \* \*